United States Patent Office 3,249,815
Patented May 3, 1966

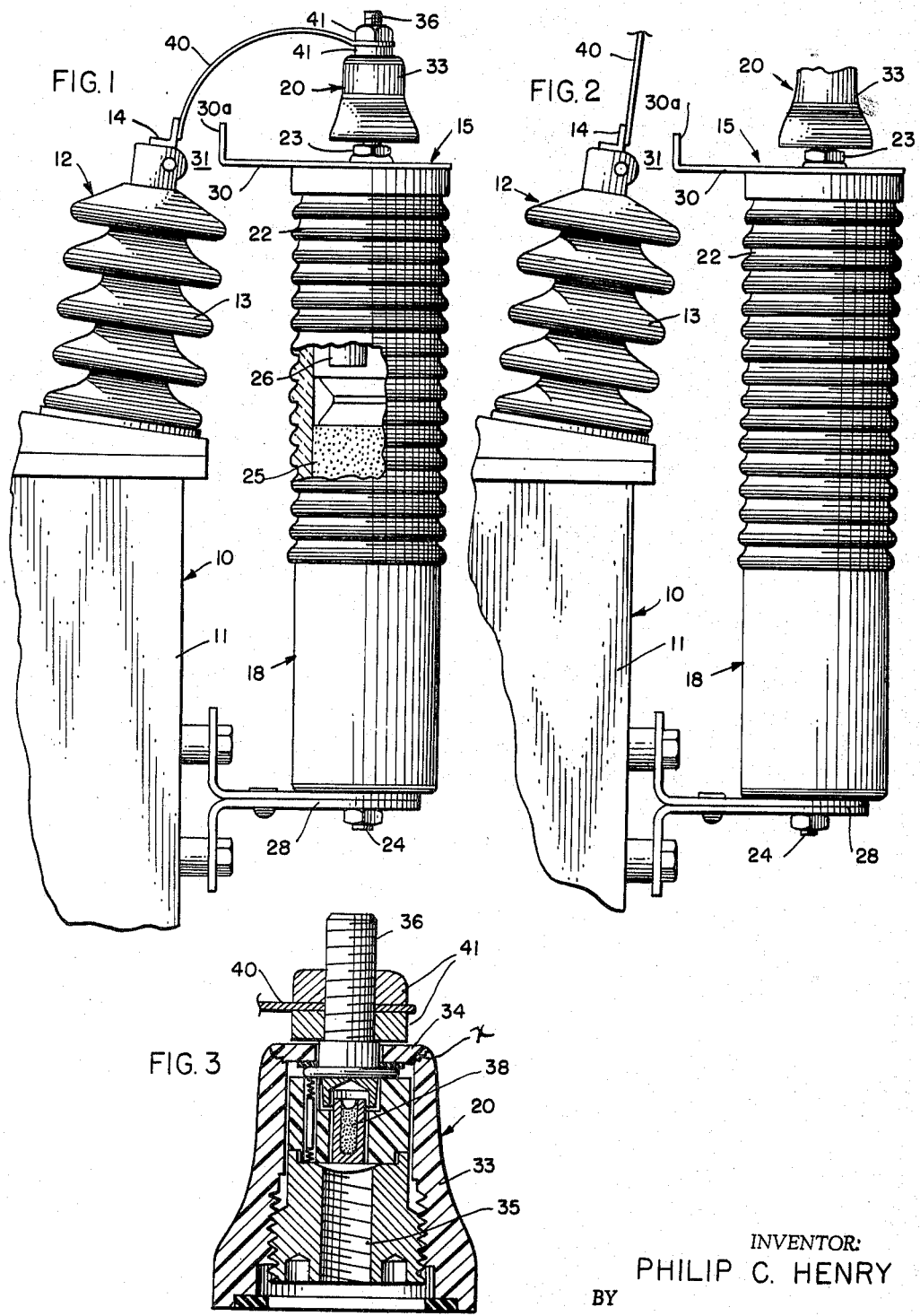

3,249,815
LIGHTNING ARRESTER IN COMBINATION WITH AN ARRESTER DISCONNECTOR HAVING A SPARK GAP IN PARALLEL WITH THE DISCONNECTOR
Philip C. Henry, St. Petersburg, Fla., assignor to Joslyn Mfg. and Supply Co., Chicago, Ill., a corporation of Illinois
Filed June 1, 1965, Ser. No. 465,241
15 Claims. (Cl. 317—15)

The present application is a continuation-in-part of application Serial No. 389,614 filed August 14, 1964, by Philip C. Henry and assigned to the same assignee as the present invention.

The present invention relates to a new and improved lightning arrester, and more particularly, the present invention is concerned with improvements in lightning arresters for the protection of electric transmission components such as power distribution transformers, and to power distribution transformer assemblies having improved lightning protective means.

Lightning arresters are employed in electrical transmission systems to provide protection against abnormal voltages existing on a power distribution component as a result of surges resulting from lightning, switching disturbances, and other causes. The function of the lightning arrester is to provide a low resistance pass to ground in order to prevent the occurrence of excess voltages caused by disturbances of the type described and, at the same time, to present a relatively high resistance under normal operating conditions so that the diversion of power current from the line is insignificant.

Present commercial practice in the protection of power transmission components generally provides for one of two types of lightning arrester connections with the components. Many components, for example power transmission transformers, which are provided with external terminals, are generally protected by an electric arrester of the type having a characteristic element and an isolating spark gap either with an external additional spark gap, or with an explosive disconnector serially connected with the lightning arrester. More specifically, in a common type of commercial lightning arrester there is provided a characteristic element connected serially with one or more internal isolating gaps which function to keep the main portion of the normal system voltage off the characteristic element in the absence of surges. The characteristic element serves to bypass to ground surge currents resulting from abnormal line voltages and to interrupt the flow of system follow current as soon as the abnormal condition has been dissipated. One such lightning arrester suitable for use in the present invention is illustrated and described in the copending application of Edward H. Yonkers, Serial No. 157,293, filed November 16, 1961, on Valve Type Lightning Arrester, and assigned to the same assignee as the present invention.

In one type of commercial installation, a lightning arrester of the type described above may have one end connected to ground potential, and the other end of the lightning arrester is provided with an external electrode spaced from the external lead of the transmission line component to provide an additional external spark gap. If the lightning arrester fails, due to abnormal load conditions such as excessive or direct lightning voltages, the arrester will fail and will afford no internal resistance to ground. Accordingly, the only protection of the transmission line component against an open short to the ground is afforded by the external gap formed in the lightning arrester system. Any small over-voltage would be sufficient to spark the external gap or to cause discharge in the gap, and the discharge would be sufficient on over-voltages to cause continuous and repetitious blowing of the component fuses. Not only is it necessary to afford fuse protection, but such repetitive line failures are undesirable from the customer standpoint. Additionally, it is difficult to detect a failed lightning arrester so that replacement may be made.

In another type of lightning protective system, the lightning arrester is serially connected with an explosive type disconnector between the external lead of the high voltage component and the ground potential. One suitable disconnector is illustrated and disclosed in Riley Patent No. 3,100,246, granted August 6, 1963, on a disconnector, and assigned to the same assignee as the present invention. The disconnector has adequate time delay so that discharges through the lightning arrester unit, sufficient to cause failure of the lightning arrester, will thereafter explode the charge in the disconnector and will consequently break or remove the arrester from the electrical transmission circuit. Although such a failed arrester can be readily detected, in the meantime the arrester unit affords no protection whatsoever to the transmission line component and subsequent over-voltage conditions may fail the transmission line component.

Accordingly, it is an object of the present invention to provide a lightning arrester unit which overcomes the abovementioned difficulties.

A further object of the present invention is to provide a new and improved transformer assembly having improved lightning protective means.

Another object of the present invention is to provide a new and improved lightning arrester unit.

Yet a further object of the present invention is to provide a new and improved lightning arrester unit which will provide a visual indication of a failed arrester, and will additionally provide continued protection against lightning surges during the intern period between the failure of the arrester and replacement thereof.

Further objects and advantages of the present invention will become apparent as the following description proceeds and the features of novelty which characterize the invention will be pointed out with particularity in the claims annexed to and forming a part of this specification.

In accordance with these and many other objects of the present invention, there is provided a lightning arrester unit for protection of a high voltage electrical transmission component. The arrester unit includes a lightning arrester of the type having an internal characteristic element and an internal spark gap of a known construction. The lightning arrester is connected across a high voltage terminal of the electrical component by an external spark gap. Additionally, an explosive type disconnector is serially connected across the external spark gap by a pre-stressed spring conductor which is effective to snap a ruptured disconnector out of the circuit and to provide a visual indication of a failed lightning arrester unit.

Advantageously, a lightning arrester unit according to the present invention not only provides a ready visual indication of a failed arrester, but additionally affords continued protection against lightning surges during the intern period between failure of the arrester and replacement thereof.

According to another feature of the present invention, there is provided an improved transformer assembly of the power distribution type in combination with the improved lightning arrester unit described above.

For a better understanding of the present invention, reference may be had to the accompanying drawing wherein:

FIG. 1 is an elevational view, in broken away section, of a lightning arrester unit according to the present invention connected across a high voltage terminal of a power transmission component;

FIG. 2 is an elevational view of the lightning arrester unit of FIG. 1, illustrated after rupture of an explosive disconnector;

FIG. 3 is a cross sectional view of a known explosive type disconnector useful in the lightning arrester unit according to the present invention;

Figure 4:
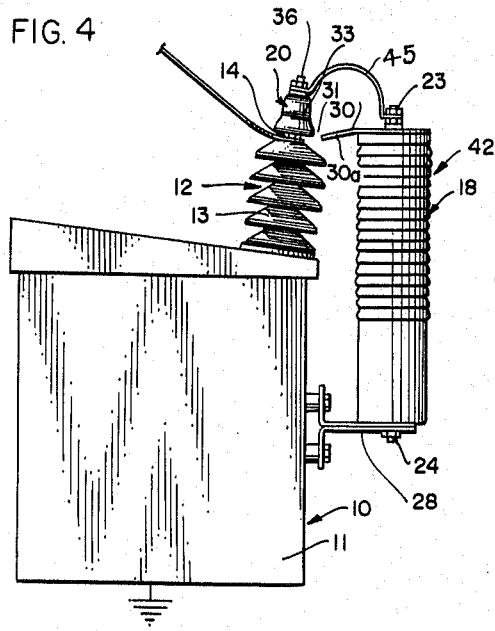
FIG. 4 is an elevational view of a transformer assembly incorporating a lightning arrester unit according to another embodiment of the present invention.

Referring now to the drawing, and particularly to FIGS. 1 and 2, there is illustrated a high voltage transmission component, here shown as a high voltage transmission transformer 10 having a grounded outer casing 11 through which extends a high voltage terminal lead 12. As is common in high voltage transformers, the terminal lead 12 extends through a stacked insulator 13 to a conductor 14 at the top of the insulator 13.

According to the present invention, the transformer 10 is protected with a lightning arrester unit 15 composed of a lightning arrester 18 and an explosive disconnector 20. The lightning arrester 18 may be of known construction and, in the illustrated embodiment, may be of the type described and claimed in the above-mentioned application of Yonkers. Accordingly, the lightning arrester need not be herein described in detail. However, briefly, the lightning arrester 18 includes an outer cylindrical housing 22 of dielectric material having an upper terminal 23 and a lower terminal 24 extending therefrom. The lightning arrester 18 contains a suitable characteristic material, here shown as valve material 25, FIG. 1, serially connected with suitable isolating spark gap means 26 within the housing 22 and electrically connected serially between the terminals 23 and 24. The lightning arrester 18 is supported on a bracket 28 electrically grounded to the grounded transformer casing 11 and connected to the lower terminal 24. An external electrode 30 is electrically connected to the upper terminal 23 and is provided with an electrode portion 30a spaced apart from the high voltage conductor 14 in the terminal lead 12 to provide an external isolating spark gap 31. If desired, the external electrode 30 may be suitably slotted to receive the upper terminal 23 thereby to provide for adjustability of the length of the isolating spark gap 31 in a known manner.

The lightning arrester unit 15 according to the present invention additionally includes the explosive disconnector 20. The explosive disconnector 20 may be of the type described and claimed in the above-mentioned Riley patent and, accordingly, need not be herein described in detail. However, briefly, as best illustrated in FIG. 3, a known explosive disconnector 20 includes a housing 33 having at one end a thin, fracturable section 34 rupturable along the region indicated at x. The disconnector 20 includes a first terminal 35 threaded unto the upper terminal 23 of the lightning arrester 18. Additionally, the disconnector 20 includes a threaded second terminal 36. Serially connected between the terminals 35 and 36 is provided a suitable explosive material 38. The explosive material 38 has an adequate time lag so that upon a destructive discharge through the lightning arrester unit 15, the lightning arrester 15 would first fail, and thereafter the explosive material 38 and the disconnector 20 would explode, rupturing the housing 33 and separating the terminals 35 and 36.

To snap the disconnector 20 apart upon explosion of the explosive material 38, and to provide a visual indication of a failed disconnector, the upper terminal 36 is connected to the high voltage terminal 12 of the transformer 10 by means of electrically conductive material such as a prestressed leaf spring 40. The spring 40 may have one end connected between a set of nuts 41 threaded on the terminal 36, and the other end connected to the conductor 14.

From the above detailed description, the operation of the improved lightning arrester unit is believed clear. However, briefly, it will be understood that the lightning arrester unit 15 includes an externally gapped lightning arrester 18 provided with an explosive disconnector 20 connected to a high voltage lead by means of a prestressed spring 40. In a good lightning arrester unit 15, the spring 40 and the explosive disconnector 20 are serially connected across the external isolating spark gap 31 of the lightning arrester 18. If a discharge occurs through the lightning arrester unit 15 of sufficient magnitude to cause failure of the lightning arrester 18, the lightning arrester 18 then acts as a short and, with suitable time delay, the explosive material 38 in the explosive disconnector 20 will be fired, rupturing the explosive disconnector 20. The prestressed spring 40 will consequently snap the upper terminal 36 of the explosive disconnector 20 apart from the remainder of the disconnector, removing the lightning arrester 18 from direct connection across the high voltage terminal. This provides a visual indication of a defective lightning arrester unit, as best illustrated in FIG. 2.

Advantageously the lightning arrester unit 15 according to the present invention continues to afford continued protection against lightning surges during the interim period after failure and before replacement of the lightning arrester unit 15 due to the isolating spark gap 31. Although the lightning arrester unit 15 after firing of the explosive disconnector 20 affords reduced resistance to ground which may result in frequent blowing of the component fuses, nevertheless adequate protection is afforded to prevent destruction of the high voltage component. Moreover, it has been found that any suitably stiff or prestressed electrical connector 40 will be effective to maintain the terminal portions 35 and 36 apart.

Figure 5:
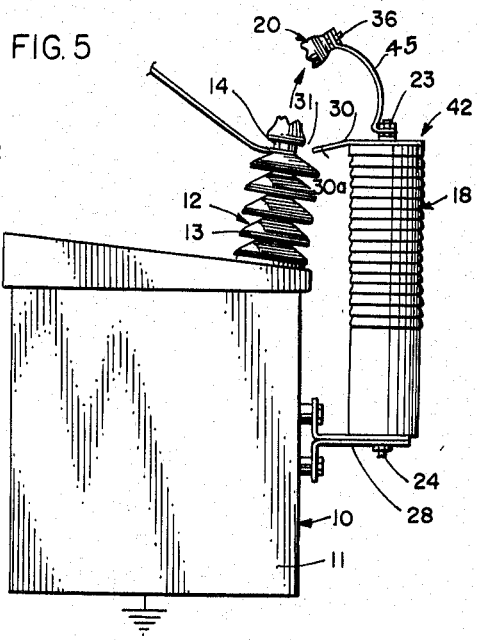
FIG. 5 is an elevational view of the transformer assembly of FIG. 4, illustrated after rupture of its explosive disconnector.

Referring now to the embodiment of FIGS. 4 and 5, there is illustrated a transformer assembly employing the improved lightning protective means wherein the explosive disconnector is mounted on the terminal of the transformer. Identical components of FIGS. 1 to 3 and FIGS. 4 and 5 are identified by the same reference numerals. More specifically, there is provided the high voltage transformer 10 having the grounded outer casing 11 through which extends the high voltage terminal lead 12. As is common in high voltage transformers, the terminal lead 12 extends through the stacked insulator 13 to the conductor 14 at the top of the insulator 13. The transformer 10 is connected with a lightning arrester unit 42 according to the present invention and composed of the lightning arrester 18 and the explosive disconnector 20. The lightning arrester 18, as heretofore described, has the upper terminal 23 and the lower terminal 24 extending therefrom. The lightning arrester 18 is supported on a bracket 28 electrically grounded to the grounded transformer casing 11 and connected to the lower terminal 24. The external electrode 30 is electrically connected through the upper terminal 23 and is provided with the electrode portion 30a spaced apart from the high voltage conductor 14 in the terminal lead 12 to provide the external isolating spark gap 31.

The lightning arrester unit 42 according to the present invention additionally includes the explosive disconnector 20. The explosive disconnector 20 as heretofore described, includes the frangible housing 33 having a lower terminal (not shown in FIGS. 4 and 5) connected to the conductor 14 on the high voltage lead 12 of the transformer 10. Additionally, the disconnector 20 includes the threaded second terminal 36.

To snap the disconnector 20 apart upon explosion of the explosive material 38 and to provide for the visual indication of a failed disconnector, the upper terminal 36 is connected to the upper terminal 23 of the lightning arrester 18 by means of a suitably stiff or prestressed electrical conductor 45.

As in the preceding embodiment, the conductor 45 and the explosive disconnector 20 are serially connected across the external isolating spark gap 31 of the lightning arrester 18. If a spark discharge occurs through the lightning arrester unit 15 of sufficient magnitude to cause failure of the lightning arrester 18, the lightning arrester 18 then acts as a short and, with a suitable time delay, the explosive material in the explosive disconnector will be fired, rupturing the explosive disconnector 20. The electrical conductor 45 will separate the ruptured portions of the explosive disconnector 20 removing the lightning arrester 18 from direct connection across the high voltage terminal of the transformer 10. This provides a visual indication of a defective lightning arrester unit, as best illustrated in FIG. 5.

Figure 6:
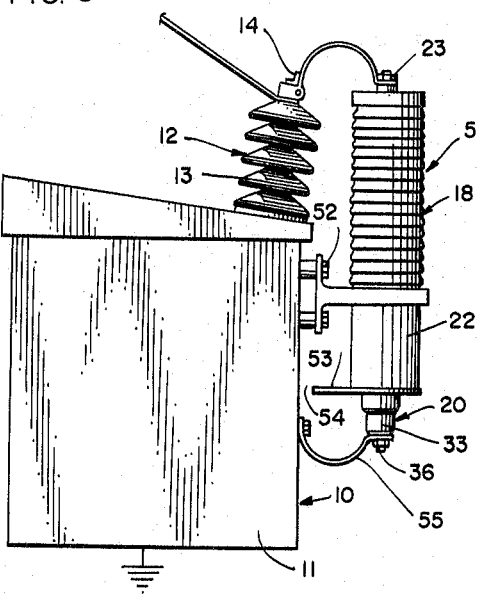
FIG. 6 is an elevational view of a transformer assembly incorporating a lightning arrester unit according to yet another embodiment of the present invention.

Referring now to the embodiment of FIG. 6, there is illustrated a transformer assembly wherein the lightning arrester is gapped to ground and the explosive disconnector shunts the gap to ground. More specifically, there is shown the high transformer 10 having the grounded outer casing 11 through which extends the high voltage terminal 12. The terminal lead 12 extends through the stacked insulator 13 to the conductor 14 at the top of the insulator 13. As in the preceding embodiments, the transformer 10 is protected with a lightning arrester unit 50 composed of a lightning arrester 18 and an explosive disconnector 20. The lightning arrester 18 may be of the type heretofore described and including an outer cylindrical housing 22 of dielectric material having the upper terminal 23 and a lower terminal (not illustrated in FIG. 6) extending therefrom. The lightning arrester 18, in the embodiment of FIG. 6, is supported on a suitable bracket 52 around the dielectric housing 22 electrically isolated from the terminals of the lightning arrester. The lightning arrester unit 50 includes a lower external electrode 53 electrically connected to the lower terminal of the lightning arrester 18 and forming an external isolating gap 54 with the grounded casing 11 of the transformer 10.

The lightning arrester unit 50 according to the present invention additionally includes the explosive disconnector 20. The explosive disconnector 20 may be of the type heretofore described including a frangible housing 33 having a first terminal (not shown in FIG. 6) connected to the lower terminal of the arrester 18, and additionally provided with an additional terminal 36 at the opposite end thereof.

To snap the disconnector 20 apart upon explosion of the explosive material within the disconnector, and to provide a visual indication of a failed disconnector, the terminal 36 is connected across the spark gap 31 by means of a suitably stiff or prestressed electrical conductor 55 having one end thereof grounded through the grounded transformer casing 11.

From the above detailed description, it will be seen that the operation of the improved lightning arrester according to the embodiment of FIG. 6 is substantially identical to that heretofore described in connection with the preceding embodiments.

Figure 7:
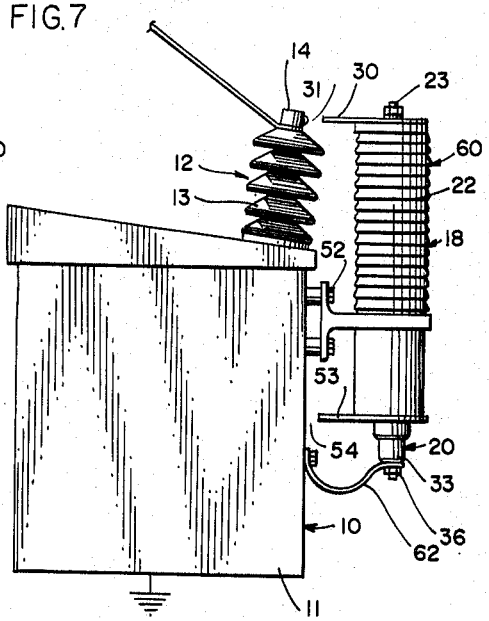
FIG. 7 is an elevational view of a transformer assembly incorporating a lightning arrester unit according to yet another embodiment of the present invention.

The embodiment of FIG. 7 illustrates a double gapped lightning arrester employing an explosive disconnector shunting across one of the external gaps. More specifically, referring not to FIG. 7, there is illustrated the high voltage transmission transformer 10 having the grounded outer casing 11 through which extends the high voltage terminal lead 12. The terminal lead 12 extends through the stacked insulator 13 to the conductor 14 at the top of the insulator 13. According to the present invention the transformer assembly is protected with a lightning arrester unit 60 composed of the lightning arrester 18 and the explosive disconnector 20. The lightning arrester 18 may be of the construction heretofore described and including the outer cylindrical housing 22 of dielectric material having the upper terminal 23 and a lower terminal (not shown in FIG. 7) extending therefrom. The lightning arrester 18 is supported on the bracket 52 through the dielectric housing 22 in electrical isolation from the terminals of the arrester. The external electrode 30 is electrically connected to the upper terminal 23 of the arrester and is provided with an electrode portion spaced apart from the high voltage conductor 14 in the terminal lead 12 to provide the external isolating gap 31. Additionally, the lightning arrester unit 60 includes the lower electrode 53 extending from the lower terminal of the lightning arrester 18 and spaced from the grounded casing 11 of the transformer 10 to provide the second external spark gap 54, thereby providing a double gapped arrester unit.

The lightning arrester unit 60 according to the present invention additionally includes the explosive disconnector 20 which may be of the type heretofore described and which includes a frangible housing 33 having a first terminal (not shown in FIG. 7) connected to the lower terminal of the arrester 18, and having a second terminal 36 extending therefrom.

To snap the disconnector 20 apart upon explosive rupture of the disconnector, and to provide a visual indication of a failed disconnector, the terminal 36 is connected to ground through a suitably stiff or prestressed electrical conductor 62. One end of the electrical conductor 62 is connected to the terminal 36 and the other end of the electrical conductor 62 is grounded through the grounded casing 11 of the transformer 10.

From the above detailed description of the embodiment of FIG. 7, it will be seen that the operation of the improved transformer assembly is substantially similar to that heretofore described.

Although the present invention has been described by reference to several embodiments thereof, it will be apparent that numerous other modifications and embodiments will be devised by those skilled in the art which will fall within the true spirit and scope of the present invention.

What is claimed as new and desired to be secured by Letters Patent of the United States is:

1. A lightning arrester unit for use with a high voltage power distribution system comprising a pair of spaced apart spark gap terminals forming an external isolating gap, a lightning arrester electrically connected to one of said spark gap terminals, said lightning arrester and said gap being normally serially electrically connected between ground and an external power source, arrester disconnector means electrically connected to one of said terminals, and electrical conducting means connecting the other of said terminals to said disconnector means, said arrester disconnector means explosively isolating said spark gap terminals from one another upon an over voltage condition, said disconnector means and said electrical conducting means indicating a failure of the lightning arrester, said gap providing protection for the external power source after isolating by said arrester disconnector means.

2. A lightning arrester unit as set forth in claim 1 above wherein the electrical conducting means comprises a deflectable member normally disposed in predetermined position in engagement with said arrester disconnector means but deflectable to a different position in the event of operation of said arrester disconnector means.

3. A lightning arrester unit as set forth in claim 1 above wherein one of said terminals is mounted on said lightning arrester.

4. A lightning arrester unit as set forth in claim 1 above wherein said lightning arrester includes a pair of arrester terminal means and one of said terminals and said arrester disconnector means are both mounted on one of said terminal means.

5. A lightning arrester unit as set forth in claim 1 above wherein said gap is between said lightning arrester and ground.

6. A lightning arrester unit as set forth in claim 1 above wherein said gap is between said lightning arrester and the external power source.

7. In combination, a lightning arrester unit, a high voltage power distribution component, said lightning arrester unit including a pair of spaced apart spark gap terminals forming an external isolating gap, a lightning arrester electrically connected to one of said spark gap terminals, said lightning arrester and said gap being normally serially electrically connected between ground and said component, arrester disconnector means electrically connected to one of said terminals, and electrical conducting means connecting the other of said terminals to said disconnector means, said arrester disconnector means explosively isolating said spark gap terminals from one another upon an over voltage condition, said disconnector means and said electrical conducting means indicating a failure of the lightning arrester, said gap providing protection for the external power source after isolating by said arrester disconnector means.

8. The combination as set forth in claim 7 above wherein one of said terminals is mounted on said high voltage component and the other of said terminals is mounted on said lightning arrester.

9. The combination as set forth in claim 8 above wherein said lightning arrester includes a pair of terminal means and said other of said terminals and said arrester disconnector means are both mounted on one of said terminal means.

10. In combination, a lightning arrester unit, a high voltage transformer, said lightning arrester unit including a pair of spaced apart spark gap terminals forming an external isolating gap, a lightning arrester electrically connected to one of said spark gap terminals, said lightning arrester and said gap being normally serially electrically connected between ground and said transformer, arrester disconnector means electrically connected to one of said terminals, and electrical conducting means connecting the other of said terminals to said disconnector means, said arrester disconnector means explosively isolating said spark gap terminals from one another upon an over voltage condition, said disconnector means and said electrical conducting means indicating a failure of the lightning arrester, said gap providing protection for said transformer after isolating by said arrester disconnector means.

11. The combination as set forth in claim 10 above wherein the electrical conducting means comprises a deflectable member normally disposed in predetermined position in engagement with said arrester disconnector means but deflectable to a different position in the event of operation of said arrester disconnector means.

12. The combination as set forth in claim 10 above wherein one of said terminals is mounted on said lightning arrester.

13. The combination as set forth in claim 10 above wherein said lightning arrester includes a pair of arrester terminal means, and one of said terminals and said arrester disconnector means both are mounted on one of said terminal means.

14. The combination as set forth in claim 10 above wherein one of said terminals is mounted on said transformer and the other of said terminals is mounted on said lightning arrester.

15. The combination as set forth in claim 14 above wherein said lightning arrester includes a pair of terminal means and said other of said terminals and said arrester disconnector means are both mounted on one of said terminal means.

References Cited by the Examiner
UNITED STATES PATENTS
2,305,436    12/1942    McMorris ---------- 200—115

BERNARD A. GILHEANY, *Primary Examiner.*

H. A. LEWITTER, *Assistant Examiner.*